(12) United States Patent
Ineyama (10) Patent No.: US 11,713,711 B2
(45) Date of Patent: Aug. 1, 2023

(54) GENERATOR

(71) Applicant: HONDA MOTOR CO., LTD., Tokyo (JP)

(72) Inventor: Ryo Ineyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/950,393

(22) Filed: Sep. 22, 2022

(65) Prior Publication Data
US 2023/0096783 A1   Mar. 30, 2023

(51) Int. Cl.
*F02B 63/04*   (2006.01)
*H02K 5/20*   (2006.01)
*H02K 9/04*   (2006.01)

(52) U.S. Cl.
CPC ............ *F02B 63/044* (2013.01); *H02K 5/20* (2013.01); *H02K 9/04* (2013.01); *F05B 2260/96* (2013.01)

(58) Field of Classification Search
CPC ... F02B 63/044; F02B 2063/045; H02K 5/20; H02K 9/04; F05B 2260/96
See application file for complete search history.

(56) References Cited

U.S. PATENT DOCUMENTS

2009/0320773 A1* 12/2009 Kobayashi ......... F02M 35/1272
123/41.31

FOREIGN PATENT DOCUMENTS

JP   S59-230448   12/1984
JP   2020-106016   7/2020

* cited by examiner

*Primary Examiner* — Jacob M Amick
(74) *Attorney, Agent, or Firm* — Rankin, Hill & Clark LLP (57) ABSTRACT

A shroud includes a first shroud that covers a first side face to which a muffler is adjacent among four side faces that an engine has, a second shroud that covers a second side face adjacent to the first side face and a third side face, and a third shroud that sections a muffler space for housing the muffler with the first shroud, the first shroud and the second shroud form an upstream side air guide path that makes cooling air flow around the engine, and the muffler space is connected to a downstream side of the upstream side air guide path.

4 Claims, 10 Drawing Sheets

GENERATOR

INCORPORATION BY REFERENCE

The present application claims priority under 35 U.S.C. § 119 to Japanese Patent Application No. 2021-157864 filed on Sep. 28, 2021. The content of the application is incorporated herein by reference in its entirety.

BACKGROUND OF THE INVENTION

Field of the Invention

The present invention relates to a generator.

Description of the Related Art

A generator including an engine, a rotating electric machine, a shroud that covers at least a part of the engine and is supplied with cooling air, and a muffler adjacent to a side part of the engine is known. In the generator of this kind, the rotating electric machine, a blowing fan and a fan cover are provided on an output shaft side of the engine and the muffler is disposed on an opposite side of the output shaft of the engine (for example, see Japanese Patent Laid-Open No. 2020-106016).

For a conventional generator, a technology of shortening an entire length of the generator by contriving a method of attaching an alternator stator winding and a fan has been proposed (for example, see Japanese Patent Laid-Open No. 59-230448).

It has been examined to change a position of a muffler in order to shorten the entire length compared to the conventional generator or the like, that is, to change the position of the muffler to the position avoiding the opposite side of the output shaft of the engine.

However, when the position of the muffler is changed, in a conventional shroud structure, it is possible that cooling air flows toward the muffler without cooling a part of the engine.

The present invention is implemented in consideration of circumstances described above, and it is an object to make it easy to achieve appropriate cooling while coping with a position change of a muffler.

SUMMARY OF THE INVENTION

A generator includes an engine, a rotating electric machine, a shroud that covers at least a part of the engine and is supplied with cooling air, and a muffler adjacent to a side part of the engine, the shroud includes a first shroud that covers a first side face to which the muffler is adjacent among four side faces that the engine has, a second shroud that covers a second side face adjacent to the first side face and a third side face adjacent to the second side face, and a third shroud that sections a muffler space for housing the muffler with the first shroud, the first shroud and the second shroud form an upstream side air guide path that makes the cooling air flow around the engine, and the muffler space is connected to a downstream side of the upstream side air guide path.

Appropriate cooling is easily achieved while coping with a position change of a muffler.

DETAILED DESCRIPTION OF THE PREFERRED EMBODIMENT

Figure 1:
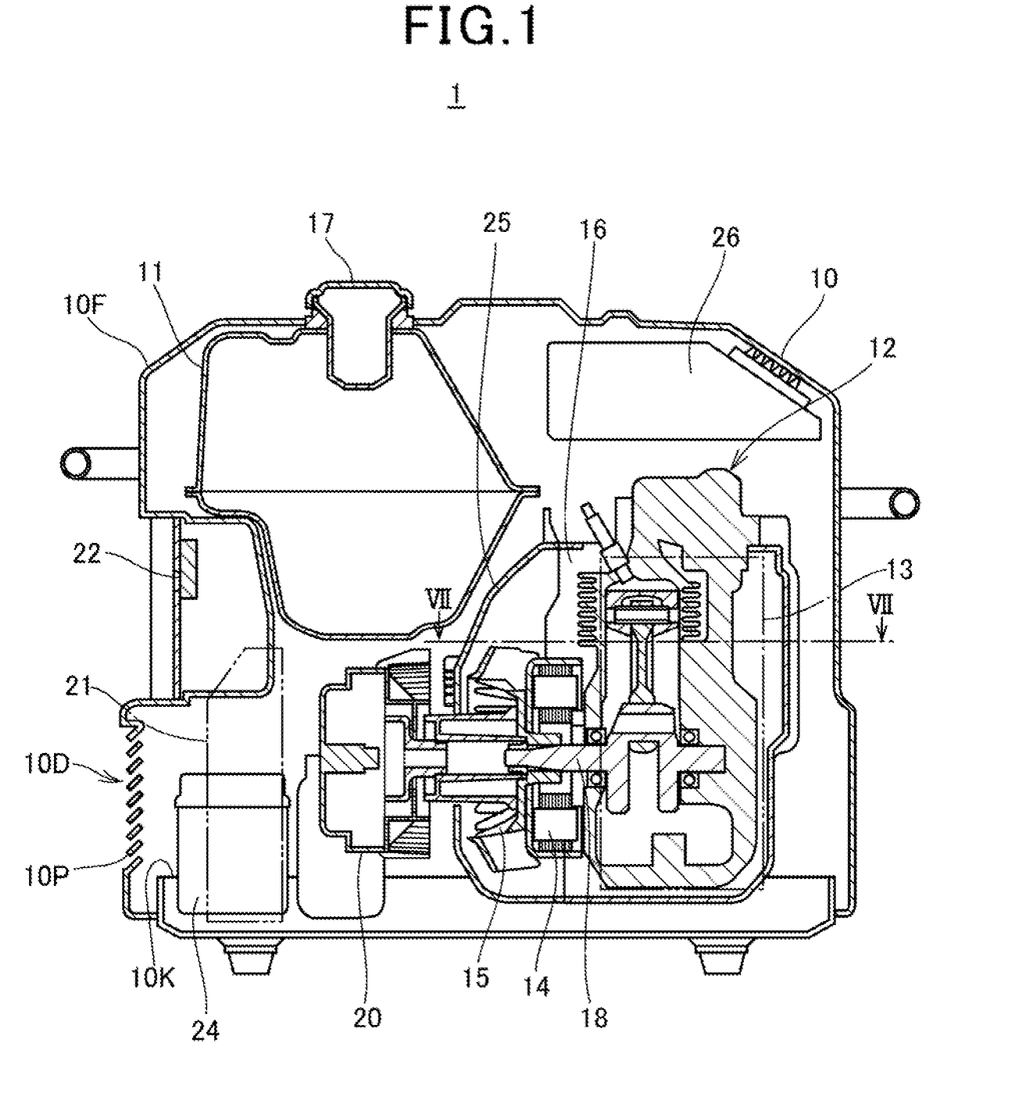
FIG. 1 is a configuration view of a generator according to the present invention.

FIG. 1 is a configuration view of a generator 1.

The generator 1 includes an outer casing 10. Inside the outer casing 10, a fuel tank 11, an engine 12, a muffler 13, an alternator 14, a fan 15, and a shroud 16 are disposed.

The fuel tank 11 includes a fuel inlet that can be accessed from an outside, and fuel can be put into the fuel tank 11 through the fuel inlet. A fuel inlet cap 17 is removably mounted on the fuel inlet.

The engine 12 is an ignition air-cooled engine driven by the fuel inside the fuel tank 11. The engine 12 includes a cylinder, a piston that reciprocates inside the cylinder, and a crankshaft 18 that is coupled to the piston through a connecting rod.

An intake pipe connected to the engine 12 is provided with a throttle valve and a fuel supply device. Air of which the volume is adjusted by the throttle valve and the fuel supplied from the fuel supply device are mixed, and this air-fuel mixture is supplied to the engine 12. The engine 12 combusts the air-fuel mixture in a combustion chamber to drive the piston and thereby rotates the crankshaft 18 through the connecting rod.

The muffler 13 is connected to an outlet of an exhaust pipe connected to the engine 12. The muffler 13 serves purposes such as reducing an exhaust pressure.

The fuel to drive the engine 12 may be gasoline or may be fuel other than gasoline. The fuel supply device may have a configuration using an injector or a configuration using a carburetor.

The generator 1 includes a control unit. The control unit has a processor such as a CPU (Central Processing Unit), and a memory such as a ROM (Read Only Memory). The control unit controls individual parts of the generator 1 as the processor executes programs stored in the memory. The control unit functions as, for example, an ECU (Electronic Control Unit) that outputs control signals for controlling output of the engine 12.

The alternator 14 is mounted to the crankshaft 18 of the engine 12. The alternator 14 is a multipolar alternator that is driven by the engine 12 to generate alternating-current power. The alternator 14 has a rotor that rotates integrally with the crankshaft 18, and a stator that is disposed concentrically with the rotor so as to face a circumferential surface of the rotor.

The rotor is provided with permanent magnets. The stator is provided with U-phase, V-phase, and W-phase windings that are disposed at a phase angle of, for example, 120 degrees to one another.

The fan 15 is also referred to as a cooling fan and is mounted on the crankshaft 18. On the crankshaft 18, a starting device 20 for starting the engine 12 is disposed. When the engine 12 is driven, power is generated by the alternator 14. When the engine 12 is driven, the fan 15 rotates, sending cooling air to the engine 12. The alternator 14 generates alternating-current power.

The shroud 16 includes a ventilation opening through which air is taken in. The shroud 16 guides the air sent by the fan 15 to the periphery of the engine 12.

The outer casing 10 includes an intake port 10K through which outside air is taken in and an exhaust port through which air having cooled the engine 12 is discharged.

The generator 1 includes an inverter 21. The inverter 21 controls a voltage and a frequency of the alternating-current power generated by the alternator 14 so as to stabilize the output.

The generator 1 further includes a control panel 22. The control panel 22 is provided with an electrical outlet, operating switches, and others.

The electrical outlet is supplied with alternating-current power from the inverter 21. A plug of a device that uses generated power is connected to the electrical outlet. Alternatively, the electrical outlet may be supplied with direct-current power.

Figure 2:
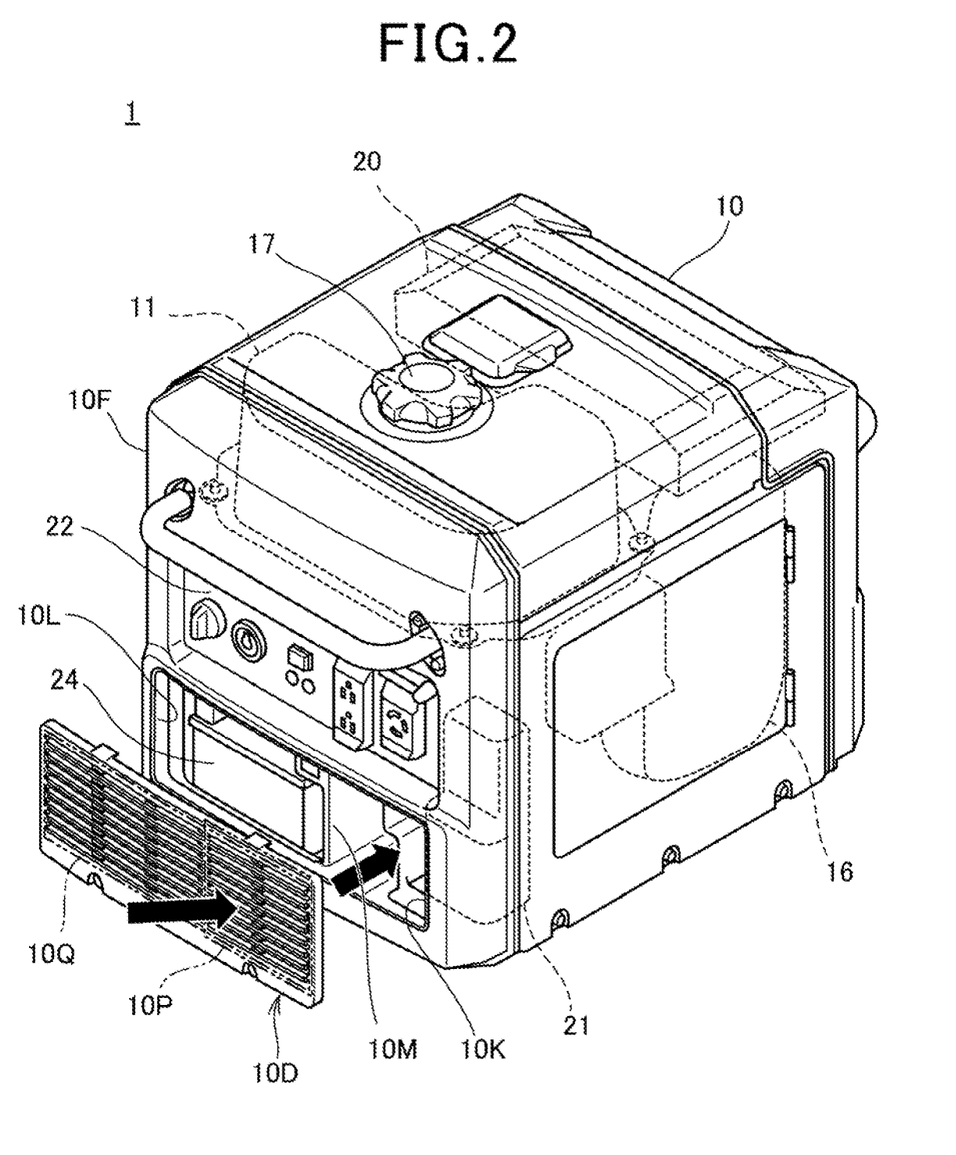
FIG. 2 is a perspective view of the generator.

FIG. 2 is a perspective view of the generator 1.

As illustrated in FIG. 1 and FIG. 2, the outer casing 10 includes a removable front cover 10F. The front cover 10F is a cover that covers a front surface of the generator 1 and is also a cover that exposes the control panel 22 to the outside. Note that individual directions in the present description are the individual directions when the front cover 10F of the generator 1 is at a front unless otherwise mentioned.

The intake port 10K through which the outside air is taken in is provided on a lower part of the front cover 10F. The intake port 10K is formed at an opening opened toward the front of the generator 1 at the lower part of the front cover 10F, and is covered by a lid member 10D including a louver so as to freely take in the air. The outside air straightened by the louver is taken in from the intake port 10K as the cooling air.

As illustrated in FIG. 2, the intake port 10K is formed in a lower right side region of the front cover 10F. In addition, on the front cover 10F, another opening 10L opened toward the front is formed on the side of the intake port 10K, more specifically in a lower left region of the front cover 10F. Between the intake port 10K and the other opening 10L, a bridge member 10M extending in an up-down direction is provided integrally with the front cover 10F.

On an inner side of the intake port 10K, the inverter 21 is disposed. On the side of the inverter 21 and on the inner side of the other opening 10L, a battery 24 that supplies operating power to the starting device 20 or the like is disposed. The other opening 10L is formed to be an opening through which the battery 24 can be freely taken out.

The lid member 10D includes a first louver part 10p that covers the intake port 10K from the front, and a second louver part 10Q that covers the other opening 10L from the front. By the individual louver parts 10p and 10Q, it is made difficult to visually recognize the inside, it is made difficult for rainwater to infiltrate, and ventilation and straightening are made possible.

The fan 15 is covered by a fan cover 25. The fan cover 25 is formed in such a shape that an end on the side of the front cover 10F is opened and a diameter is increased toward the engine 12. The cooling air which is made to flow into the fan cover 25 through the intake port 10K by the fan 15 flows into the shroud 16 surrounding the periphery of the engine 12.

The fan 15 is formed to be a cooling fan that rotates integrally with the rotor of the alternator 14, and is, in other words, a cooling fan that rotates integrally with a rotating electric machine. Note that the configuration of the fan 15 and the rotating electric machine may be appropriately changed.

The shroud 16 is a cooling air path sectioning body that sections a cooling air path through which the cooling air is made to flow around the engine 12, and also functions as a noise reducing member that reduces noise transmitted from the engine 12 to the outside and a heat influence reducing member that reduces heat influence from the engine 12 onto the surrounding members or the like. The fan cover 25 and the shroud 16 are formed of a resin material for example, but may not be limited to the resin material.

The cooling air having cooled the engine 12 passes around the muffler 13 and is discharged through a silencing chamber 26 to the outside. The silencing chamber 26 is provided above the engine 12 and the muffler 13.

Figure 3A:
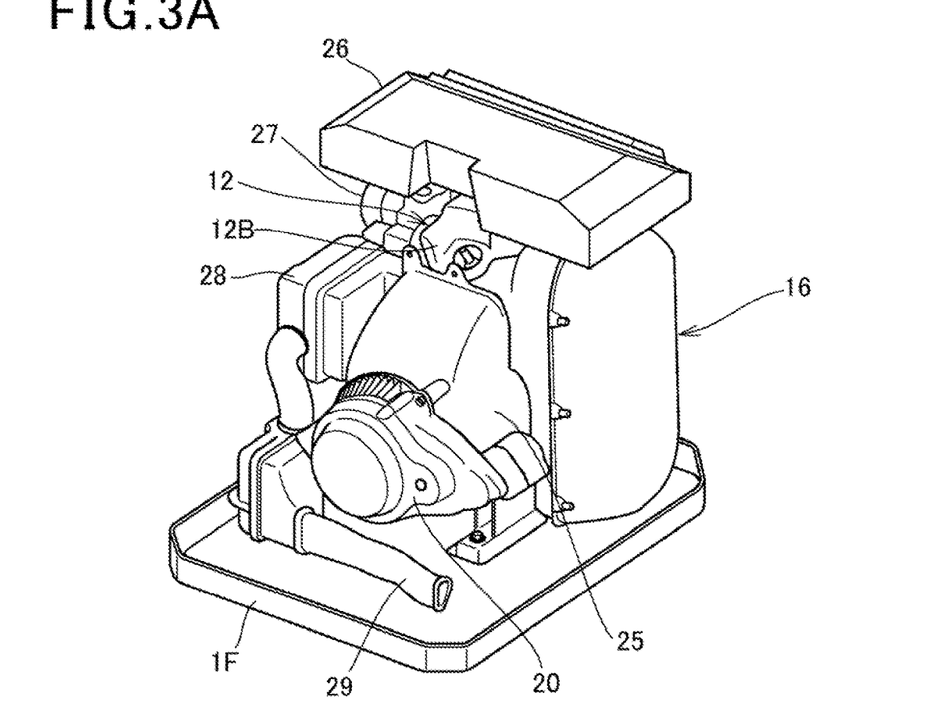
FIGS. 3A and 3B are drawings illustrating an engine together with a peripheral configuration.
Figure 3B:
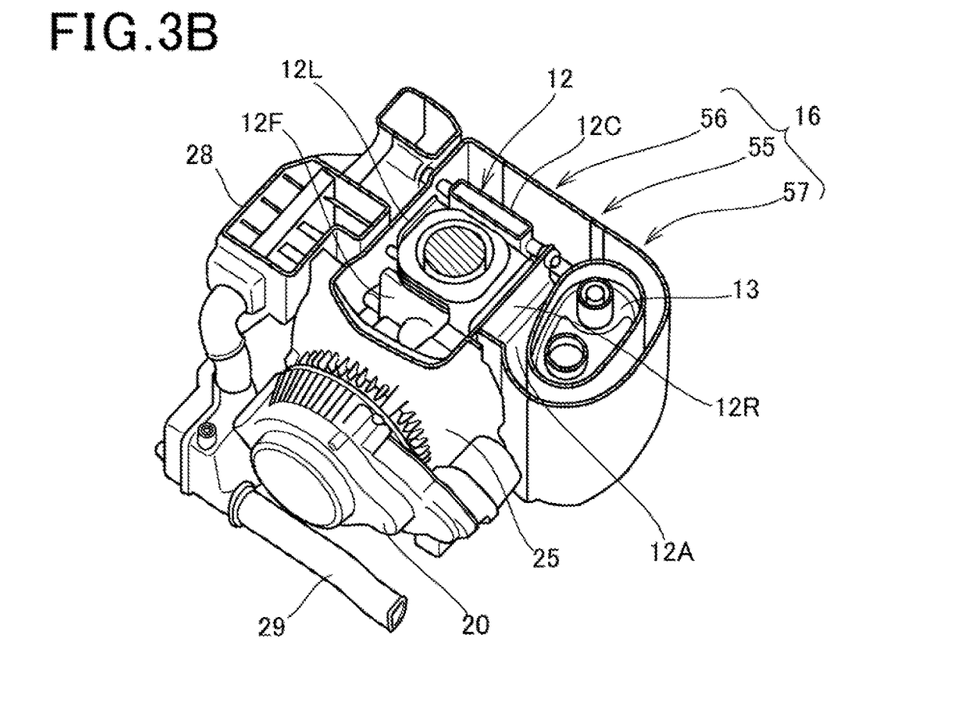

FIGS. 3A and 3B are drawings illustrating the engine 12 together with a peripheral configuration. FIG. 3A illustrates an appearance of the engine 12, the fan cover 25, the shroud 16 and the silencing chamber 26 or the like, and FIG. 3B is a drawing illustrating a horizontal cross section at a middle height of the engine 12 together with the peripheral configuration.

The generator 1 includes an under frame 1F configuring a bottom surface of the generator 1, and the engine 12 is mounted on the under frame 1F. For the engine 12, a cylinder part 12B is erected on a crankcase 12A that freely rotatably supports the crankshaft 18 (FIG. 1).

As illustrated in FIG. 3B, a front surface 12F (the surface where the crankshaft 18 serving also as an output shaft is projected) of the engine 12 is covered by the fan cover 25. In addition, remaining surfaces (a left side face 12L, a right side face 12R and a back surface 12C) of the engine 12 are covered by the shroud 16.

Note that a sign 27 in FIG. 3A denotes a throttle body coupled to an intake port of the engine 12, and the throttle body 27 is provided with a throttle valve and a fuel supply device. In addition, a sign 28 in FIGS. 3A and 3B denotes an air cleaner connected to an upstream side of the throttle body 27, and a sign 29 denotes an intake passage connected to the air cleaner 28.

Figure 4A:
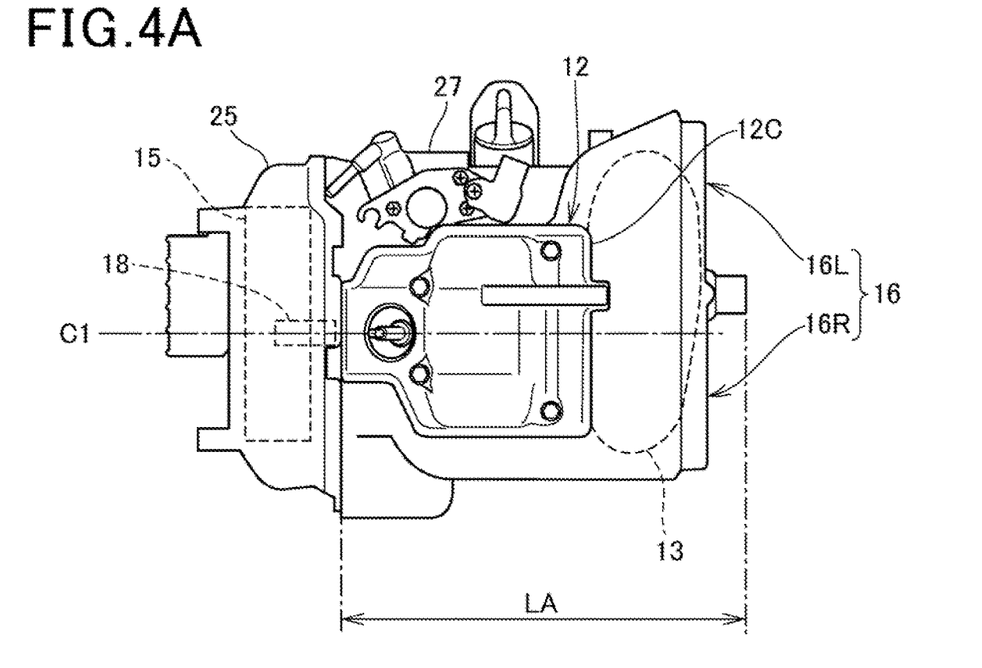
FIGS. 4A and 4B are drawings provided for explaining a layout of parts including a muffler.
Figure 4B:
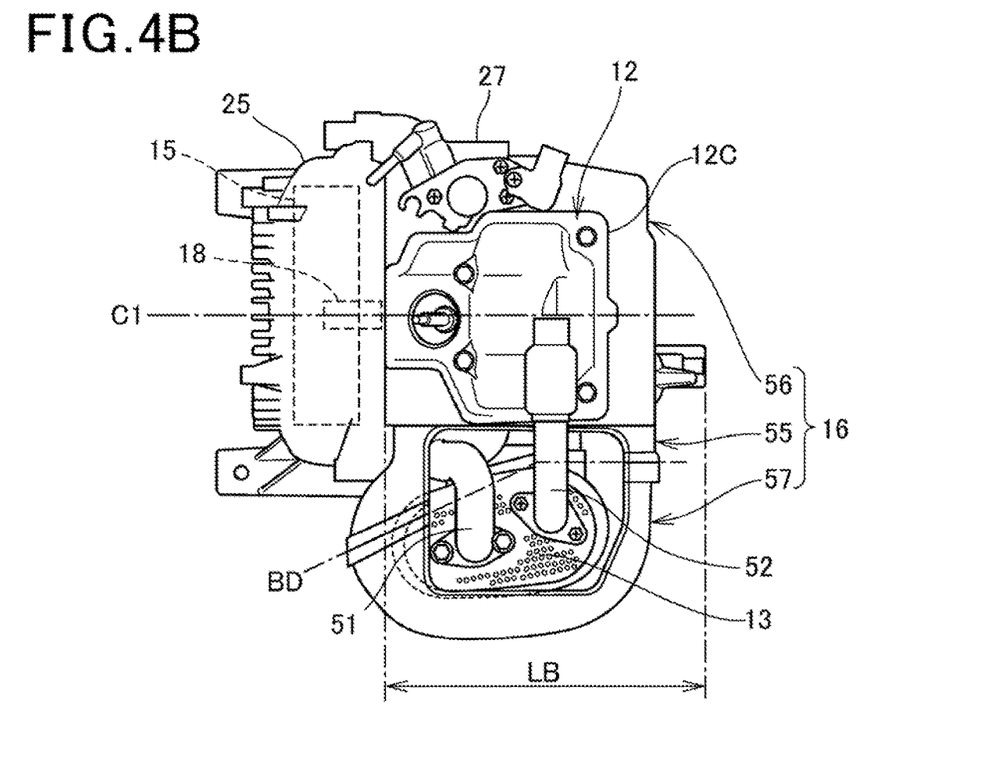

FIGS. 4A and 4B are drawings provided for explaining a layout of parts including the muffler 13, FIG. 3A is a drawing illustrating a conventional layout of parts from above, and FIG. 4B is a drawing illustrating the layout of parts of the present embodiment from above. A sign C1 in FIGS. 4A and 4B denotes a line (crankshaft center line) passing through a center of the crankshaft 18.

In a conventional generator, the muffler 13 is disposed on the side of the back surface 12C of the engine 12, a length LA (in FIG. 4A, the length needed to dispose the engine 12 and the muffler 13) along an entire length direction of the generator 1 becomes long. As the length LA is longer, a long space is needed for a generator installation space and the space where installation is possible is limited.

In the future, as exhaust gas regulations and noise regulations become stricter, it is conceivable that the need of disposing a catalyzer in the muffler 13 or increasing a muffler capacity arises and the muffler 13 is enlarged. When the muffler 13 is enlarged, the length LA of the generator becomes further longer. In addition, since a left-right width becomes short relative to the entire length of the generator 1, the generator easily falls down in a left-right direction (corresponding to the direction orthogonal to the length LA) depending on left-right width setting.

In contrast, in the present embodiment, as illustrated in FIG. 4B, the muffler 13 is disposed at a position adjacent to the right side face 12R of the engine 12. Accordingly, a length LB (the length needed to dispose the engine 12 and the muffler 13) along the entire length direction of the generator 1 can be made shorter than before. In addition, increase of the entire length can be suppressed even when the muffler 13 is enlarged, the space needed for the installation can be brought closer to a square in a top view and installability can be easily improved.

However, in the case of muffler disposition in the present embodiment, when a conventional shroud structure of a left-right bisection structure (the shroud structure formed of left and right shrouds 16L and 16R illustrated in FIG. 4A) is adopted, there is a risk that the cooling air takes a shortcut to the side of the muffler 13 without cooling the right side face 12R of the engine 12.

Note that, in FIG. 4B, a sign 51 denotes an exhaust pipe connecting the engine 12 and the muffler 13 and a sign 52 denotes a tail pipe extending from the muffler 13.

Figure 5:
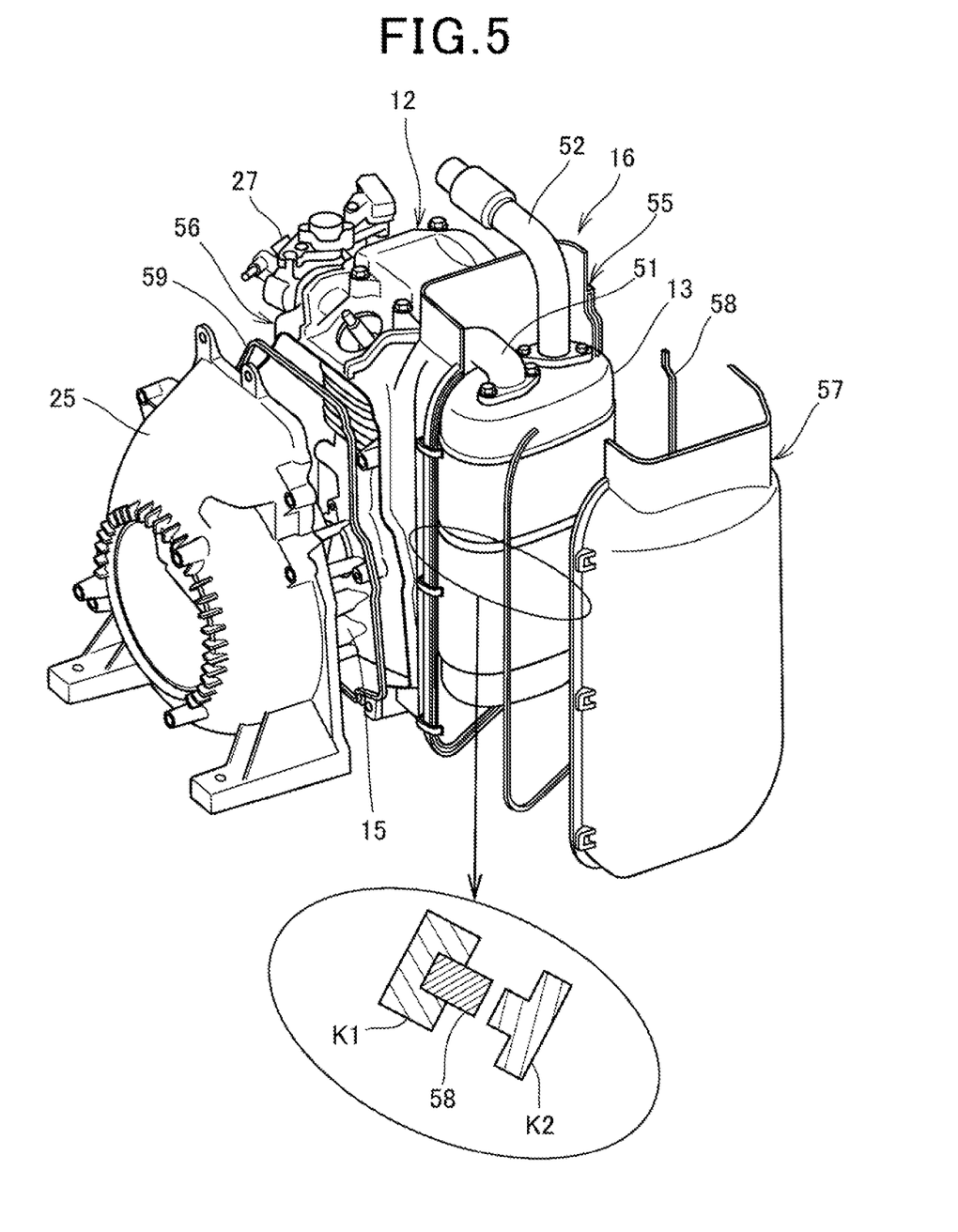
FIG. 5 is an exploded perspective view provided for explaining a shroud.

FIG. 5 is an exploded perspective view provided for explaining the shroud 16.

The shroud 16 is formed in a three-division structure formed of a first shroud 55, a second shroud 56 and a third shroud 57.

The first shroud 55 is a shroud that covers the right side face 12R of the engine 12, and is also referred to as an "R inner shroud". The second shroud 56 is a shroud that covers the back surface 12C and the left side face 12L of the engine 12, and is also referred to as an "L shroud". The third shroud 57 is a shroud that sections a muffler space for housing the muffler 13 with the first shroud.

The fan cover 25 is coupled to the side part of the first shroud 55 and the second shroud 56. Thus, all of the four side faces (the side faces 12R, 12C, 12L and 12F illustrated in FIGS. 3A and 3B or the like) that the engine 12 has are covered by the shroud 16 and the fan cover 25.

As illustrated in FIG. 5, a sealing member 58 is held between the first shroud 55 and the third shroud 57, and a situation where the cooling air at a high temperature inside the shrouds 55 and 57 leaks is prevented. The sealing member 58 is interposed between a recessed part K1 provided on one of the first shroud 55 and the third shroud 57 and a projected part K2 provided on the other, and the shrouds 55 and 57 are coupled to each other by a predetermined fixing member (a fastening member or a clip). Accordingly, the sealing member 58 is held between the recessed part K1 and the projected part K2.

A sealing member 59 is interposed also between the fan cover 25 and the first shroud 55 and the second shroud 56, and the situation where the cooling air in the inside leaks is prevented. Note that, for a sealing structure including the sealing member 58, other known sealing structures may be applied.

Figure 6:
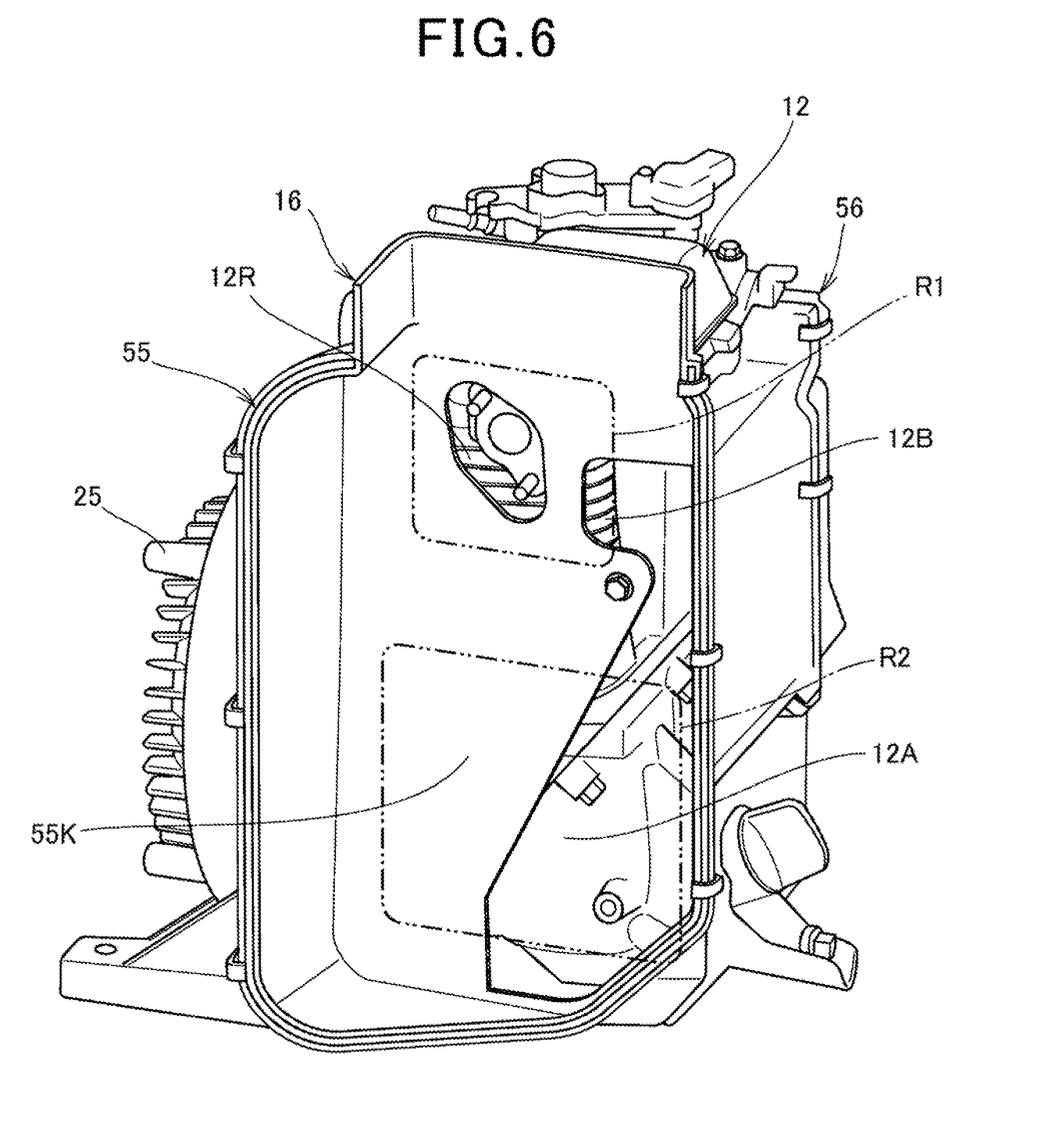
FIG. 6 is a drawing illustrating a first shroud from a side of a right side face of the engine.

FIG. 6 is a drawing illustrating the first shroud 55 from the side of the right side face 12R of the engine 12. The first shroud 55 integrally includes a partition wall 55K positioned between the right side face 12R of the engine 12 and the muffler 13.

Here, regions R1 and R2 surrounded by two-dot chain lines in FIG. 6 are regions where cooling by the cooling air is desired. The region R1 is the side face of the cylinder part 12B, and the region R2 is a side face region of the crankcase 12A.

The partition wall 55K is formed in a planar shape extending along the regions R1 and R2 while keeping a gap with the regions R1 and R2 from the upstream side (the side of the fan cover 25) of the cooling air, and functions as an air guiding member that guides the cooling air to the regions R1 and R2. In addition, a downstream side of the cooling air on the partition wall 55K is opened and the cooling air having cooled the regions R1 and R2 can be made to flow to the muffler space between the first shroud and the third shroud 57.

Since the partition wall 55K is positioned between the engine 12 and the muffler 13, the partition wall 55K also functions as a heat shield plate that suppresses the heat influence from the muffler 13 to the engine 12.

Figure 7:
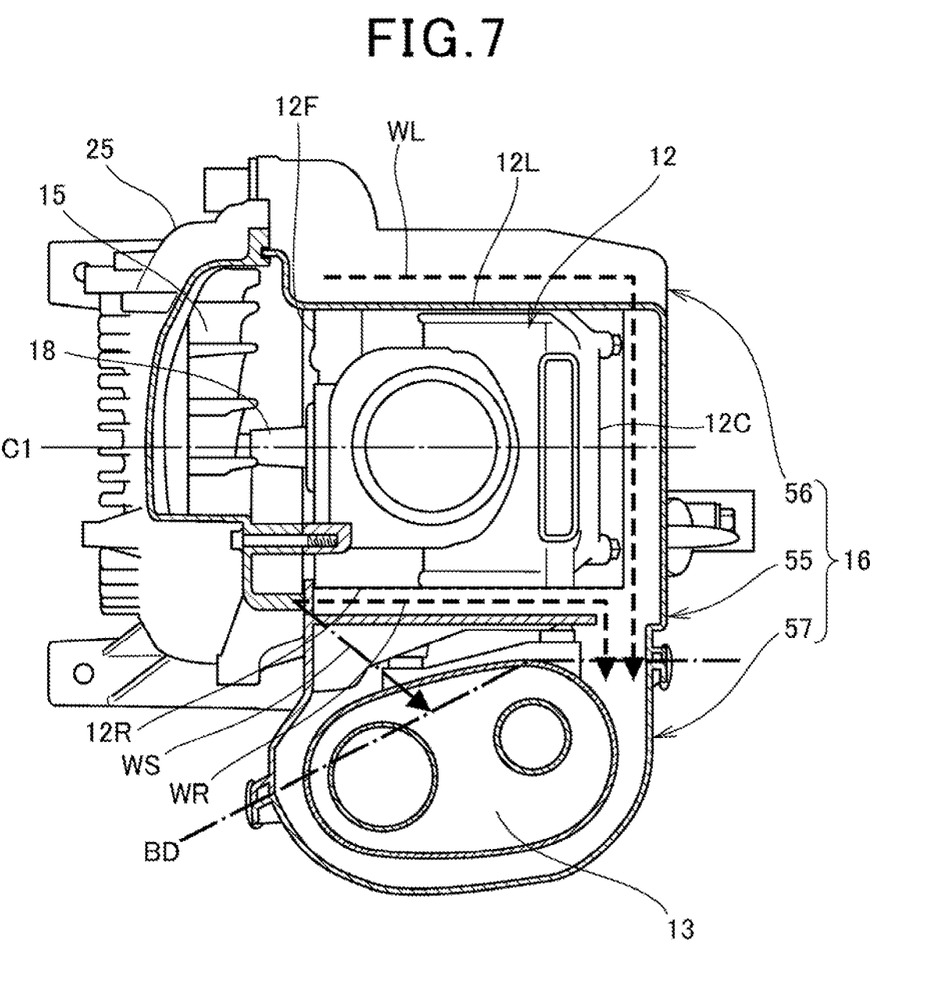
FIG. 7 is a VII-VII sectional view of FIG. 1.

FIG. 7 is a VII-VII sectional view of FIG. 1, and schematically illustrates flow of cooling air WL and WR in the shroud 16. The cooling air WL illustrates the cooling air flowing inside the second shroud from the fan cover 25, and the cooling air WR illustrates the cooling air flowing inside the first shroud from the fan cover 25.

The cooling air WL flows in order through the left side face 12L and the back surface 12C of the engine 12 and flows into the muffler space between the first shroud 55 and the third shroud 57. Thus, the left side face 12L and the back surface 12C of the engine 12 can be effectively cooled.

The cooling air WR is guided toward the right side face 12R of the engine 12 by the partition wall 55K and then flows into the muffler space. Thus, the right side face 12R of the engine 12 (including the regions R1 and R2) can be effectively cooled.

If the partition wall 55K is omitted, cooling air WS (see FIG. 7) flows from the fan cover 25 to the muffler space through a shortest route, and it becomes difficult to make the cooling air flow to the right side face 12R of the engine 12. Thus, the risk that the engine 12 cannot be appropriately cooled arises.

Note that the right side face 12R corresponds to a "first side face" of the present invention, the back surface 12C corresponds to a "second side face" of the present invention, and the left side face 12L corresponds to a "third side face" of the present invention. In addition, the front surface 12F corresponds to a "fourth side face" of the present invention.

Figure 8:
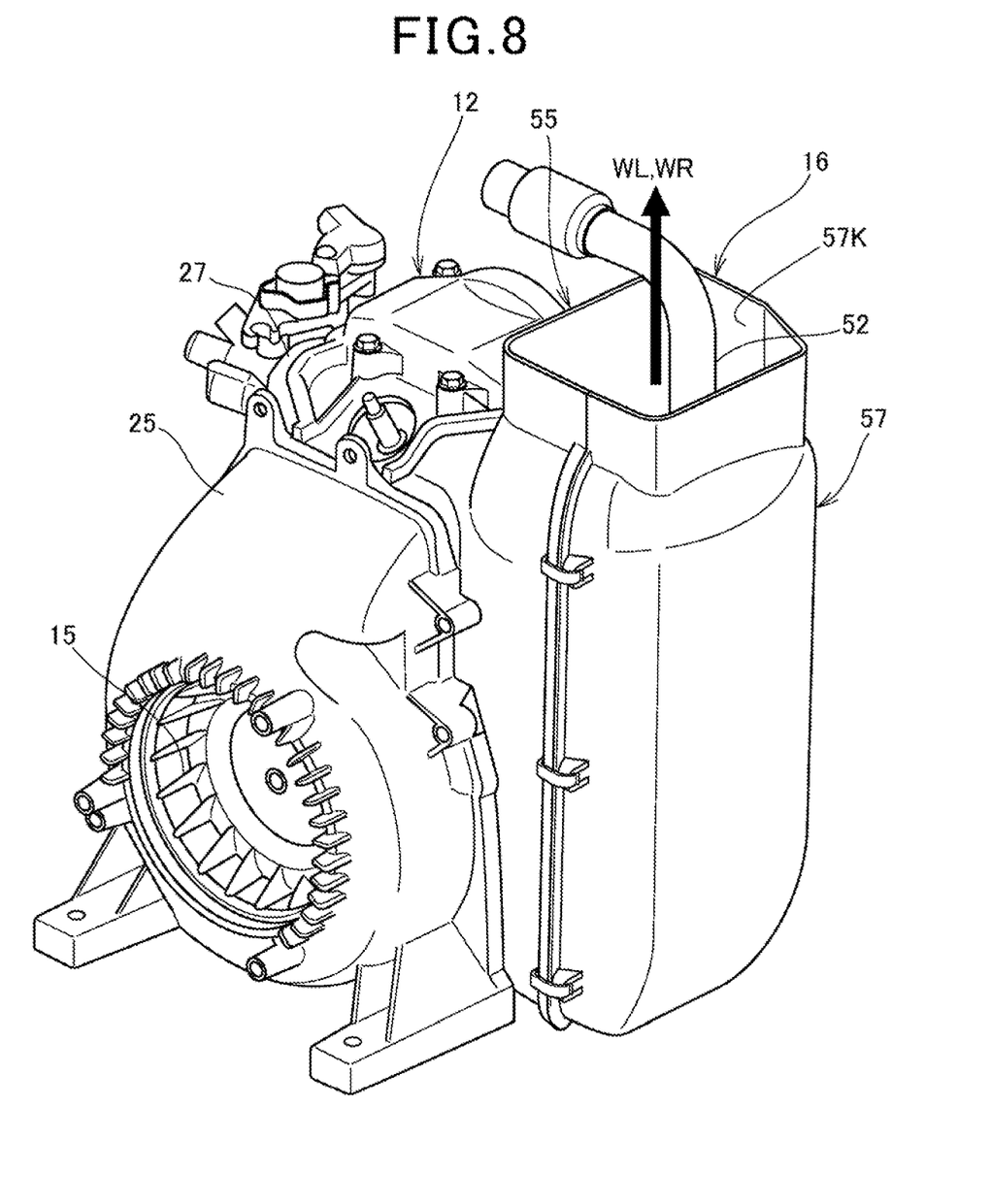
FIG. 8 is a drawing illustrating the shroud together with the peripheral configuration from the side of a third shroud.

FIG. 8 is a drawing illustrating the shroud 16 together with the peripheral configuration from the side of the third shroud 57. Between the third shroud 57 and the first shroud 55, an upward opening 57K opened upwards is provided.

The upward opening 57K is an outlet of the cooling air inside the muffler space. Accordingly, after the cooling air is made to flow in an ascending order of a heat generation temperature, which is the order of the engine 12 and the muffler 13, by the shroud 16, the cooling air is discharged from the upward opening 57K to the outside of the shroud 16.

The upward opening 57K is also a disposition space of the tail pipe 52, and the tail pipe 52 can be also cooled by the cooling air.

Figure 9:
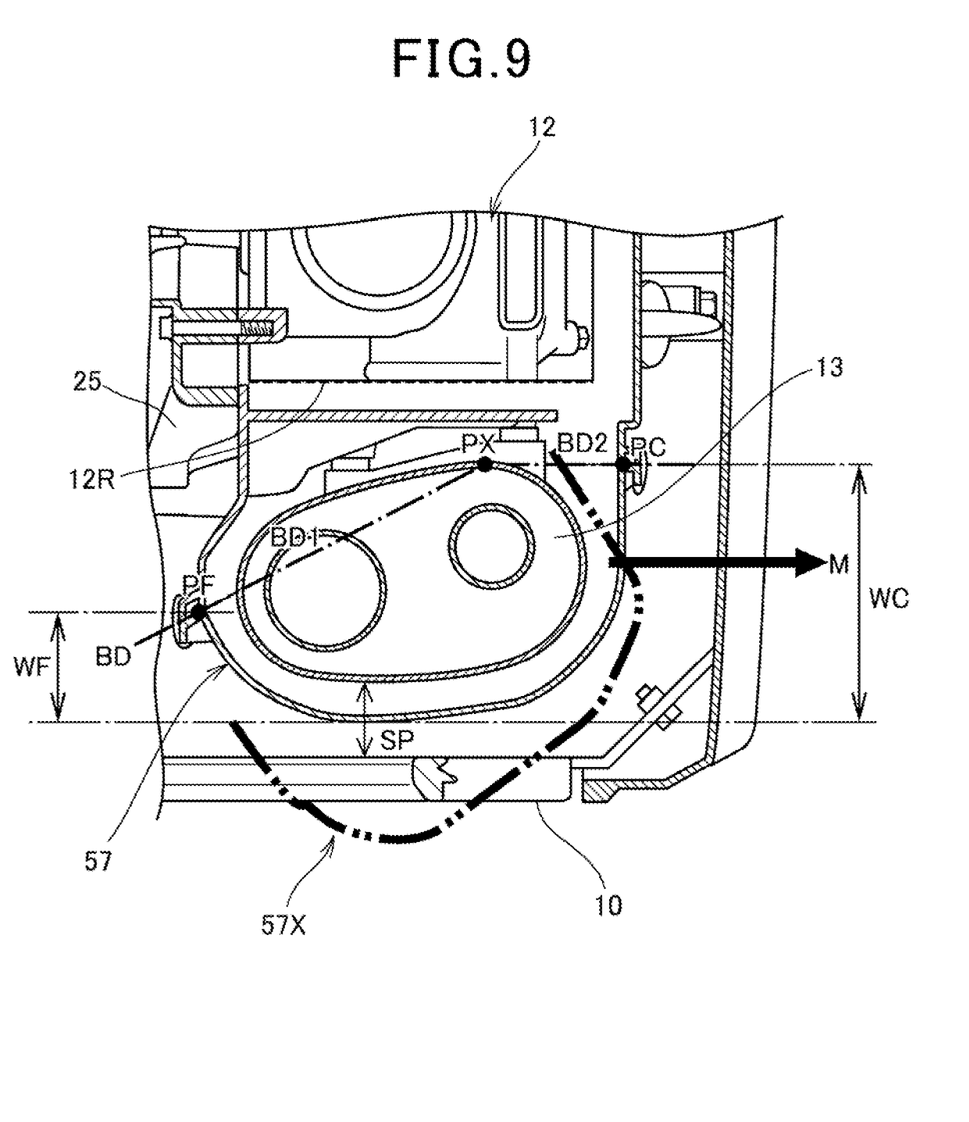
FIG. 9 is a drawing in which a muffler region in FIG. 7 is enlarged.

Next, a joining shape of the first shroud 55 and the third shroud 57 and detachment of the muffler 13 will be explained. FIG. 9 is a drawing in which a muffler region in FIG. 7 is enlarged. FIG. 9 and FIG. 7 illustrate a boundary BD of the first shroud 55 and the third shroud 57 by a two-dot chain line.

As illustrated in FIG. 9, in the top view of the generator 1, at least a part of the boundary BD (which may be also referred to as a division surface) of the first shroud 55 and the third shroud 57 is formed obliquely to the right side face 12R of the engine 12. More specifically, the boundary BD includes an inclined boundary BD1 extending obliquely so as to gradually separate from the right side face 12R of the engine 12 based on a predetermined reference position PX illustrated in FIG. 9, and a straight boundary BD2 extending in parallel with the right side face 12R of the engine 12 based on the reference position PX.

The reference position PX is set at a position closest to the engine 12 (the right side face 12R) of the surface on the side of the engine 12 of the muffler 13, and is set at the position closest to the back surface 12C of the engine 12 in the present embodiment. In addition, a sign PF in FIG. 9 denotes a front end of the first shroud 55, and a sign PC denotes a rear end of the first shroud 55.

In the present configuration, the boundary BD is set as described above, a front end width WF of the third shroud 57 is formed relatively narrow, and a rear end width WC of the third shroud 57 is formed relatively wide.

Accordingly, the third shroud 57 is settled to be in a size to be housed in a space between the first shroud 55 and the outer casing 10 formed of a rectangular box body, and when detaching the third shroud 57 in a direction illustrated by an arrow M in FIG. 9 (referred to as a "detaching direction M", hereinafter), the part of the front end width WF of the third shroud 57 is easily moved in the detaching direction M from a space SP between the muffler 13 and the outer casing 10.

Note that, while illustrations are omitted, it is assumed that the outer casing 10 is provided with an opening for moving the third shroud 57 to the outside of the outer casing 10 on the position corresponding to the detaching direction M.

When the third shroud 57 is detached, the entire back surface of the muffler 13 is exposed to the rear, and the entire side face of the muffler 13 is exposed to a side outer side (corresponding to the right side of the generator 1). Thus, an operator who is to exchange the muffler 13 can easily accesses the muffler 13 and move the muffler 13 in the detaching direction M.

That is, the first shroud 55 of the present configuration is formed in an opening shape of exposing the entire back surface of the muffler 13 to the rear and also in the opening shape of exposing the entire side face of the muffler 13 to the side outer side. Therefore, the muffler 13 is easily accessed not only from the back surface side of the muffler 13 but also from the side outer side of the muffler 13, a degree of freedom of a moving direction of the muffler 13 is improved, and the detaching direction M may not be limited to the direction illustrated in FIG. 9.

By the configuration above, the operator easily accesses the muffler 13 and easily detaches the muffler 13 in the detaching direction M illustrated in FIG. 9 or the like. Thus, the muffler 13 is easily detached even when the muffler 13 is enlarged, and exchange work of the muffler 13 is facilitated when the catalyzer or the like in the muffler 13 is deteriorated.

Note that, when the boundary BD of the first shroud 55 and the third shroud 57 is set on an extended line of the straight boundary BD2, the third shroud 57 is turned to the shape illustrated by a sign 57X in FIG. 9. In this case, when the third shroud 57X is to be moved in the detaching direction M, as illustrated in FIG. 9, the third shroud 57X needs to be greatly moved to the right side of the generator 1. Therefore, the third shroud 57X cannot be detached just in the space SP, and it is difficult to detach the muffler 13 in the state where the outer casing 10 is mounted.

As explained above, the generator 1 of the present embodiment includes the shroud 16 that covers at least a part of the engine 12 and is supplied with the cooling air, and the muffler 13 adjacent to the side part of the engine 12. The shroud 16 includes the first shroud 55 that covers the right side face 12R (the first side face) to which the muffler 13 is adjacent among the four side faces that the engine 12 has, the second shroud 56 that covers the back surface 12C (the second side face) adjacent to the right side face 12R and the left side face 12L (the third side face), and the third shroud 57 that sections the muffler space for housing the muffler 13 with the first shroud 55. The first shroud 55 and the second shroud 56 form an upstream side air guide path that makes the cooling air flow around the engine 12, and the muffler space is connected to the downstream side of the upstream side air guide path.

According to the configuration, since the upstream side air guide path covering the three side faces of the engine 12 can be formed by the first shroud 55 and the second shroud 56, the engine 12 can be cooled independent of the position of the muffler 13. Also, since the muffler space is connected to the downstream side of the upstream side air guide path, the cooling air can be supplied in order from the engine 12 to the muffler 13, and the engine 12 and the muffler 13 are easily and appropriately cooled. Thus, appropriate cooling is easily achieved while coping with a position change of the muffler 13.

The first shroud 55 includes, as illustrated in FIG. 6, the partition wall 55K positioned between the engine 12 and the muffler 13. Thus, the heat influence from the muffler 13 to the engine 12 is suppressed and the cooling air is easily guided from the side of the engine 12 to the side of the muffler 13.

In addition, the partition wall 55K covers the region R1 corresponding to at least the cylinder part 12B on the right side face 12R such that the cooling air can pass through. Thus, the cylinder part 12B to reach a relatively high temperature is easily cooled by the cooling air.

Further, as illustrated in FIG. 5, the sealing member 58 is held between the first shroud 55 and the third shroud 57. Accordingly, the situation that the cooling air that has reached a high temperature with heat of the engine 12 and the muffler 13 leaks to the outside of the shroud 16 can be avoided, and recirculation of the cooling air can be prevented.

In addition, as illustrated in FIG. 9, in the top view of the generator 1, at least a part of the boundary BD of the first shroud 55 and the third shroud 57 is oblique to the right side face 12R of the engine 12. Accordingly, the third shroud 57 and the muffler 13 are easily detached in the detaching direction M illustrated in FIG. 9 while saving space. Thus, the exchange work of the muffler 13 is facilitated.

The embodiment described above is just one embodiment of the present invention, and arbitrary modifications and applications are possible without deviating from the gist of the present invention. For example, the position of the muffler 13 may not be limited to the position adjacent to the right side face 12R of the engine 12 and may be the position adjacent to the left side face 12L of the engine 12 for example.

The shroud 16 in the three-division structure of the present invention can achieve an appropriate arrangement of the cooling air and maintainability improvement so that the shroud 16 may be applied to the generator of various types without being limited to the case of being applied to the generator 1 illustrated in FIG. 1. In addition, the shroud 16 in the three-division structure of the present invention may be applied to an arbitrary product group including a heating element requiring cooling and a built-in object requiring maintenance.

Figure 10A:
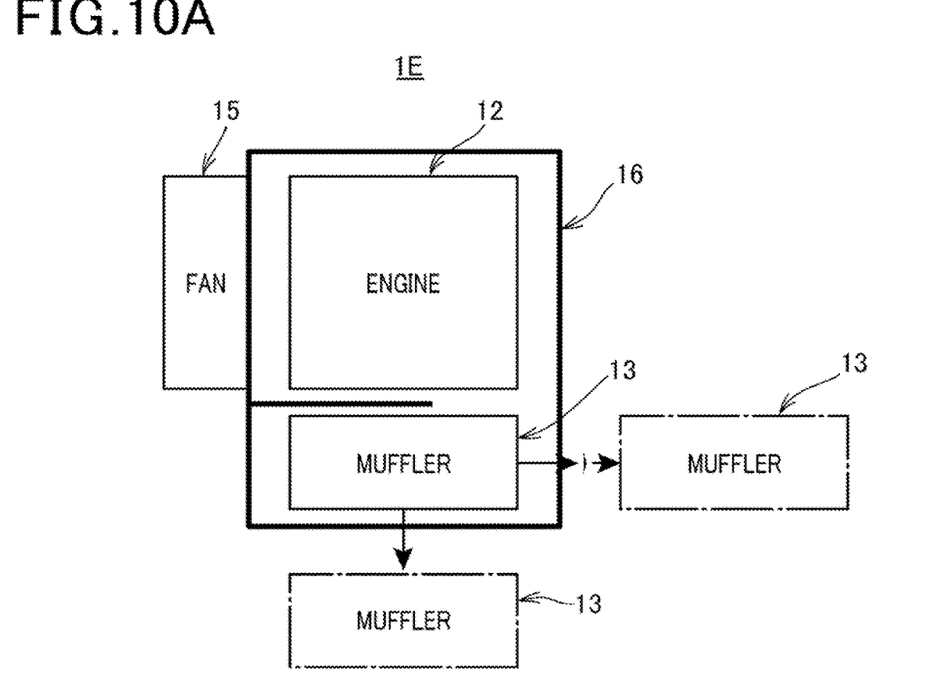
FIGS. 10A and 10B are drawings provided for explaining a product group to which the shroud in a three-division structure is applied.
Figure 10B:
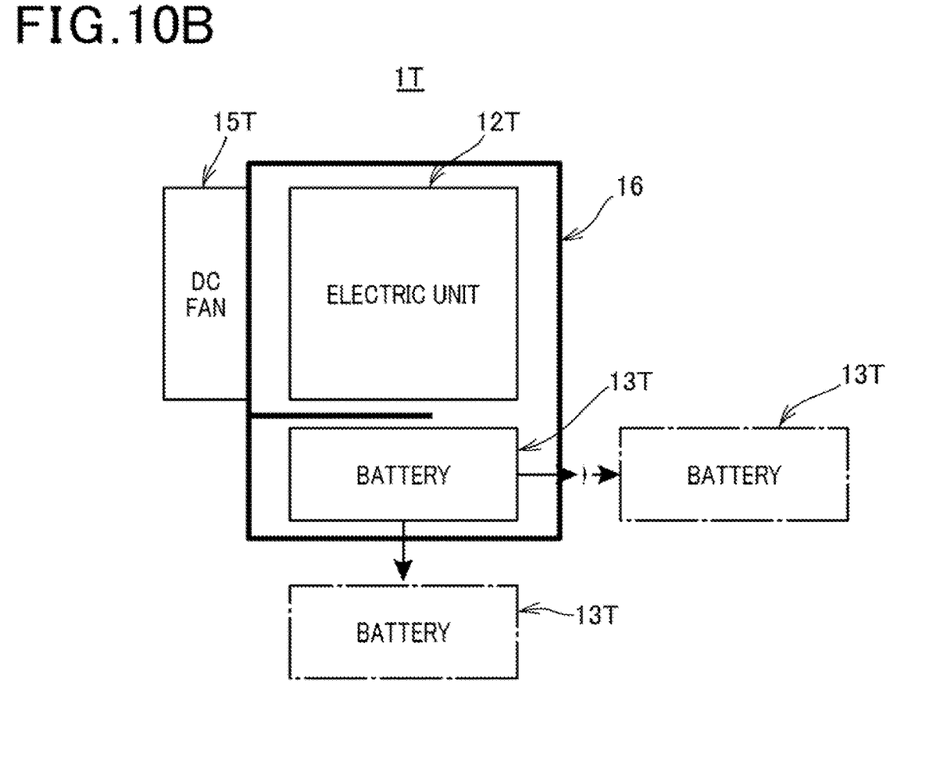

FIGS. 10A and 10B are drawings provided for explaining a product group to which the shroud 16 in the three-division structure is applied. FIG. 10A illustrates an outline configuration in the case of being applied to an arbitrary generator 1E, and FIG. 10B illustrates an outline configuration in the case of being applied to an arbitrary capacitor 1T.

In the case of the generator 1E, similarly to the generator 1 described above, the engine 12 to be the heating element and the muffler 13 are housed in the shroud 16 and the engine 12 and the muffler 13 are cooled by introducing the cooling air from the fan 15 into the shroud 16. In addition, the muffler 13 is disposed so as to be freely taken out from the shroud 16 as the built-in object requiring the maintenance. As illustrated in FIG. 10A, the muffler 13 can be taken out in a plurality of directions, and the degree of freedom of a frame structure of the generator 1E is improved.

Further, the capacitor 1T includes a battery 13T, an electric unit 12T for converting electric power from the battery 13T to predetermined electric power and outputting it, and a DC fan 15T operated by the electric power of the battery. The electric unit 12T includes an inverter and a control circuit. In the case of the capacitor 1T, the electric unit 12T to be the heating element and the battery 13T are housed in the shroud 16 and the electric unit 12T and the battery 13T are cooled by introducing the cooling air from the DC fan 15T into the shroud 16. In addition, the battery 13T is disposed so as to be freely taken out from the shroud 16 as the built-in object requiring the maintenance. The battery 13T can be taken out in a plurality of directions, and the degree of freedom of a frame structure of the capacitor 1T is improved.

[Configurations Supported by Embodiment Described Above]

The embodiment described above supports the following configurations.

(Configuration 1) A generator including an engine, a rotating electric machine, a shroud that covers at least a part of the engine and is supplied with cooling air, and a muffler adjacent to a side part of the engine, wherein the shroud includes a first shroud that covers a first side face to which the muffler is adjacent among four side faces that the engine has, a second shroud that covers a second side face adjacent to the first side face and a third side face adjacent to the second side face, and a third shroud that sections a muffler space for housing the muffler with the first shroud, the first shroud and the second shroud form an upstream side air guide path that makes the cooling air flow around the engine, and the muffler space is connected to a downstream side of the upstream side air guide path.

According to the configuration, since the upstream side air guide path covering the three side faces of the engine can be formed by the first shroud and the second shroud, the engine can be cooled independent of the position of the muffler. Also, since the muffler space is connected to the downstream side of the upstream side air guide path, the cooling air can be supplied in order from the engine to the muffler, and the engine and the muffler are easily and appropriately cooled. Thus, appropriate cooling is easily achieved while coping with a position change of the muffler.

(Configuration 2) The generator according to configuration 1, wherein the first shroud includes a partition wall positioned between the engine and the muffler.

According to the configuration, the heat influence from the muffler to the engine is suppressed and the cooling air is easily guided from the side of the engine to the side of the muffler.

(Configuration 3) The generator according to configuration 1 or 2, wherein the partition wall covers a region corresponding to at least a cylinder part on the first side face such that the cooling air can pass through.

According to the configuration, the cylinder part to reach a relatively high temperature is easily cooled by the cooling air.

(Configuration 4) The generator according to any one of configurations 1-3, wherein a sealing member is held between the first shroud and the third shroud.

According to the configuration, the situation that the cooling air that has reached a high temperature leaks to the outside of the shroud can be avoided, and recirculation of the cooling air can be prevented.

(Configuration 5) The generator according to any one of configurations 1-4, wherein at least a part of a boundary of the first shroud and the third shroud is oblique to the first side face of the engine in a top view of the generator.

According to the configuration, the third shroud and the muffler are easily detached in a predetermined detaching direction while saving space or detached in various directions, and the exchange work of the muffler is facilitated.

REFERENCE SIGNS LIST 1, 1E generator
1T capacitor
10 outer casing
10D lid member
10F front cover
10K intake port
11 fuel tank
12 engine
12A crankcase
12B cylinder part
12F front surface of engine
12R right side face (first side face) of engine
12C back surface (second side face) of engine
12L left side face (third side face) of engine
13 muffler
14 alternator (rotating electric machine)
15 fan (cooling fan)
16 shroud
18 crankshaft
20 starting device
21 inverter
22 control panel
24 battery
25 fan cover
26 silencing chamber
55 first shroud
55K partition wall
56 second shroud
57 third shroud
C1 crankshaft center line
WL, WR cooling air

What is claimed is:
1. A generator comprising an engine, a rotating electric machine, a shroud that covers at least a part of the engine and is supplied with cooling air, and a muffler adjacent to a side part of the engine, wherein     the shroud includes a first shroud that covers a first side face to which the muffler is adjacent among four side faces that the engine has, a second shroud that covers a second side face adjacent to the first side face and a third side face adjacent to the second side face, and a third shroud that sections a muffler space for housing the muffler with the first shroud,     the first shroud and the second shroud form an upstream side air guide path that makes the cooling air flow around the engine, and the muffler space is connected to a downstream side of the upstream side air guide path,     at least a part of a boundary of the first shroud and the third shroud is oblique to the first side face of the engine in a top view of the generator.

2. The generator according to claim 1, wherein the first shroud includes a partition wall positioned between the engine and the muffler.

3. The generator according to claim 2, wherein the partition wall covers a region corresponding to at least a cylinder part on the first side face such that the cooling air can pass through.

4. The generator according to claim 1, wherein a sealing member is held between the first shroud and the third shroud.

\* \* \* \* \*